Apr. 24, 1923.

R. S. SMITH 1,453,026

APPARATUS FOR ARC WELDING

Filed Dec. 6, 1918  3 Sheets-Sheet 1

INVENTOR
Reuben Stanley Smith
BY
W. F. Woodard
ATTORNEY

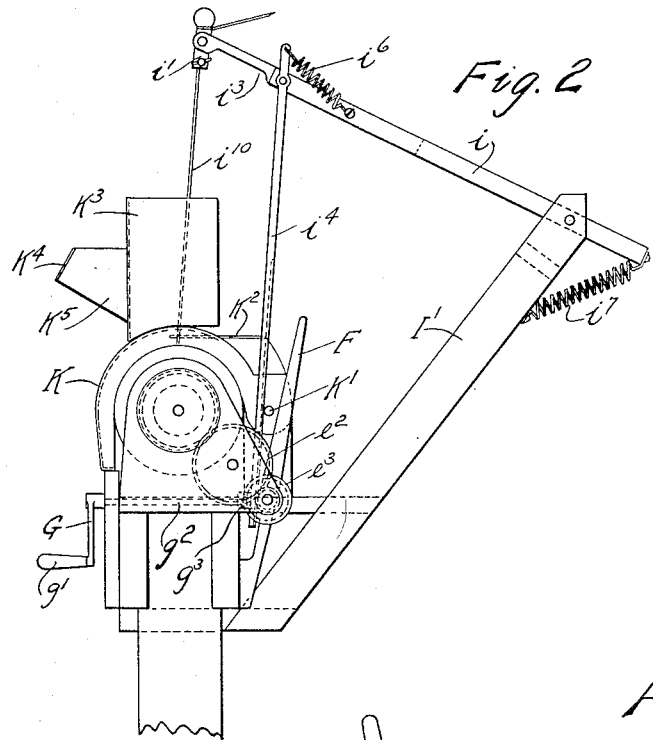
Fig. 2
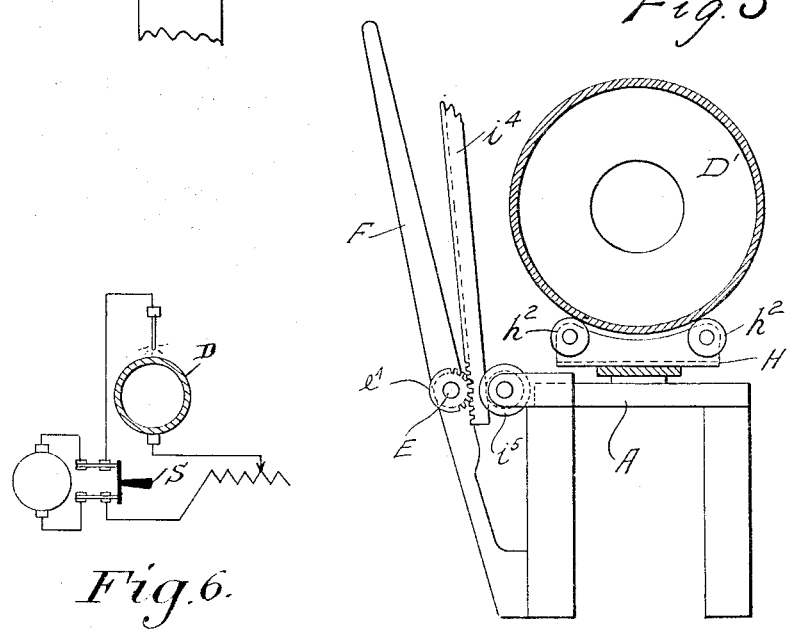
Fig. 3
Fig. 6.

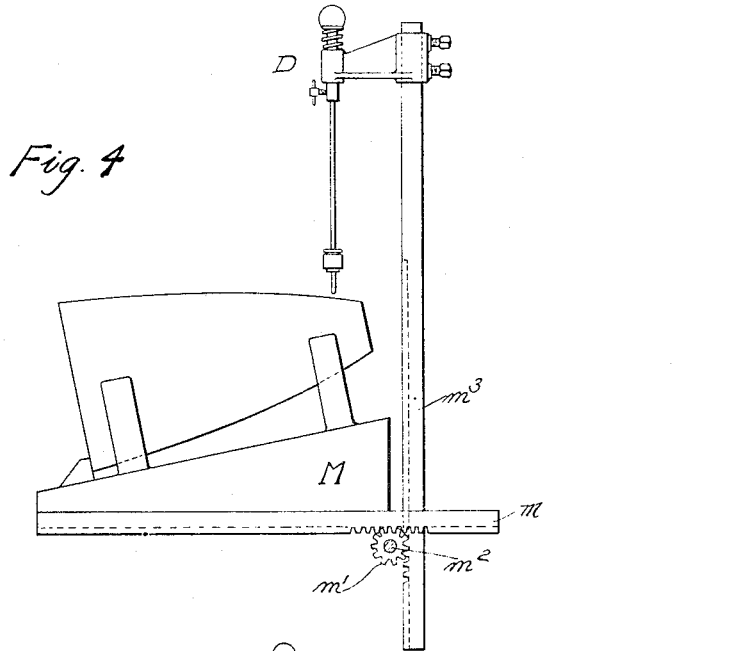
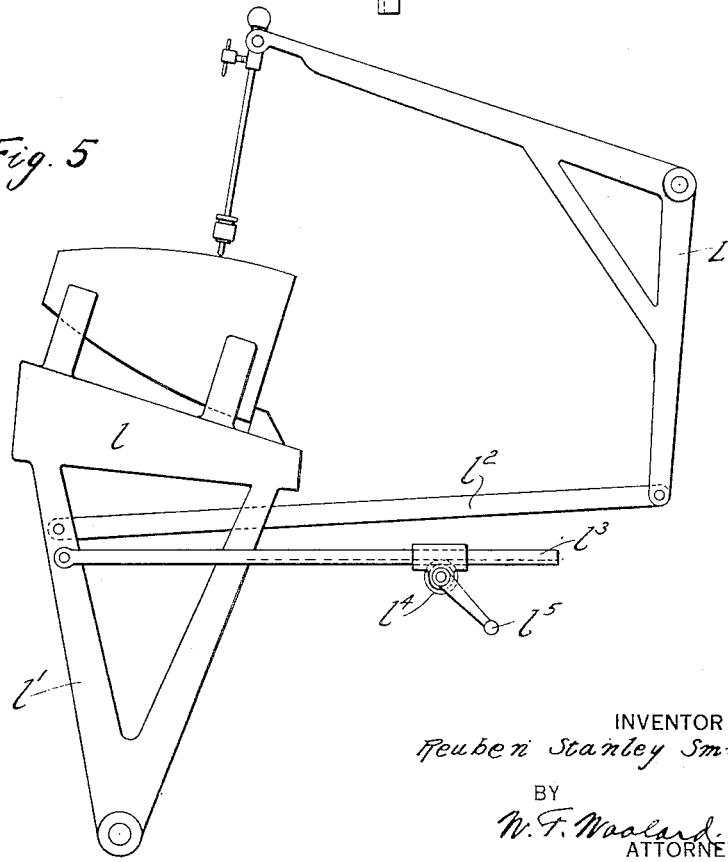

Patented Apr. 24, 1923.

1,453,026

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

APPARATUS FOR ARC WELDING.

Application filed December 6, 1918. Serial No. 265,523.

*To all whom it may concern:*

Be it known that I, REUBEN STANLEY SMITH, a citizen of the United States, residing in the city of Milwaukee, in the county of Milwaukee and State of Wisconsin, have invented a new and useful Improvement in Apparatus for Arc Welding, and do hereby declare that the following is a full, clear, and exact description thereof, such as will enable persons skilled in the art to which the invention pertains to make, use, and practice the same, reference being had to the drawings hereto attached for disclosure as to certain details of construction and arrangement.

The invention relates to that branch of arc-welding in which the work is incorporated in the electrical circuit, and in which a fusible electrode is also employed, such electrode being consumed or fused by the heat created by the electric arc, and the molten metal flowing from the fused electrode being deposited at the union of the surfaces which are to be welded, during the travel of the electrode along the welding line. The surfaces to be welded are thus united by the complete amalgamation or union of the materials, so as to produce a joint which is uniform as to structure and maximum as to strength.

My invention resides in the process of arc-welding which consists of arranging the work and a fusible electrode in an electrical circuit, giving an initial movement to the electrode to strike an arc, and moving the work past the point of the electrode, whereby the fused metal of the electrode is caused to be evenly deposited along the welding line, to produce a weld or joint homogeneous as to its union by reason of the complete amalgamation of the surfaces to be welded.

My present invention in the several forms of apparatus in which it has been embodied, is designed to effect an arc-weld along a line extending either longitudinally or circumferentially in relation to the parts to be welded, and without restriction as to its use, I may say that specific application thereof has been made in welding the longitudinal seams as well as the abutting ends of the tubular sections of aerial bombs.

In performing the operation of welding longitudinally, or seam welding, a tubular section of the bomb is in one form of my apparatus moved past the point of an electrode which is fused and deposited along the welding line, the feeding movement of the fusible electrode employed for welding being at a rate which is in direct ratio to the travel of the surface of the shell section at the welding line, a given length or section of the electrode being fused and deposited upon a corresponding section of the surfaces to be welded, so that the fused metal of the electrode is deposited evenly and uniformly upon and throughout the welding line. In its general arrangement, this form of the apparatus for seam welding is similar to that disclosed in my application of even date, Serial No. 265,522 to which reference may be had for details as to the construction, and for the generic process of arc-welding invented by me.

My invention in another specific form, designed for belt welding, comprises devices for positioning, clamping and rotating the shell sections, and also for feeding the fusible electrode in the required ratio as above stated, while the shell sections are being rotated and the electrode fused, to unite the shell sections at their abutting edges.

In addition to the devices through the instrumentality of which rotary motion is imparted to the shell sections, in belt welding, I have devised means for giving an axial motion to the shell sections, whereby the welding line travels, relatively, a zig-zag course around the shell.

My invention also comprises devices for imparting in connected and timed relation the rotary movement of the shell and the feeding movement of the electrode, with the provision of means for disconnecting these devices so that the electrode feeding device may have a movement independently of the shell rotating device, whereby the electrode feeding device may be restored to normal position upon completion of a welding operation, it being understood that the shell rotating device in any position is in normal position.

In the accompanying drawings,

Fig. 2, is an end view from the right of Fig. 1.

Fig. 3, is an enlarged view, from the left, showing the devices for positioning the shell sections, and also the provisions for disconnecting the electrode feeding devices, for movement to normal position, independently of the devices for rotating the shell sections.

Fig. 4, shows diagrammatically my invention for seam welding with the parts arranged for movement of the shell section past the point of a relatively stationary electrode.

Fig. 5, shows a modification of the actuating means for the shell section, but operating in the same manner as in Fig. 4.

Fig. 6 is a diagram of the electrical wiring of the apparatus.

Figure 1:
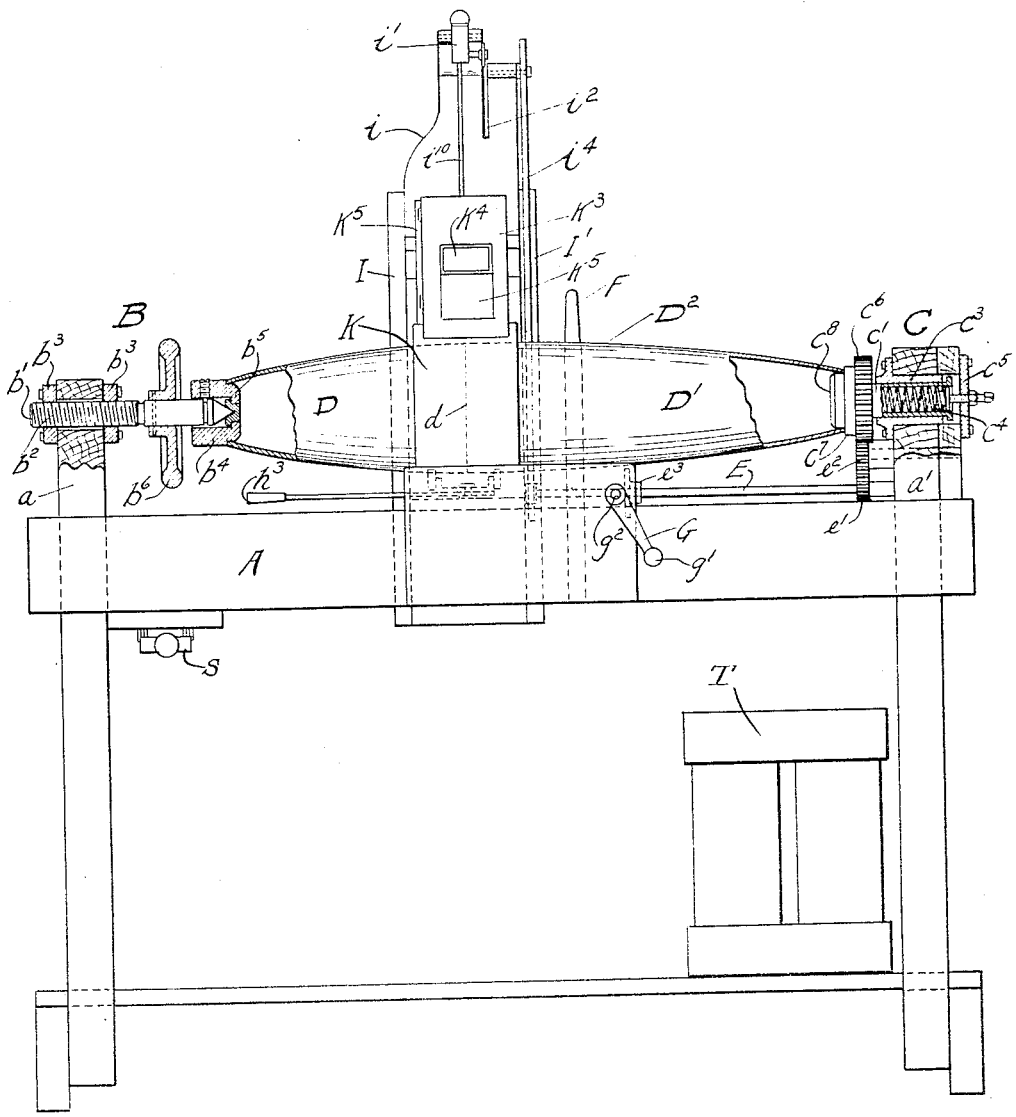
Fig. 1, is a view in elevation, partly in section, showing my belt welding apparatus, as hereinafter described in detail.

In the drawings, a table A, is provided with blocks $a$ and $a^1$, in which are journalled the chucks B and C, for supporting and clamping the shell sections D and $D^1$, of an aerial bomb $D^2$, after the said sections have been aligned for welding at their abutting ends, as indicated at the dotted line $d$, Fig. 1.

The chuck B, constructed as a short shaft $b^1$, threaded at $b^2$, is received in tapped plates $b^3$, arranged upon opposite sides of the block $a$, to give an elongated bearing. Freely rotating upon the other end of the shaft $b^1$, is a cap $b^4$, reduced at $b^5$, and adapted to enter and shoulder against the outer end of the tubular section D. The conical point of the shaft is stepped in a bearing inserted in the cap $b^4$. A hand wheel, $b^6$, of wood, or a hand wheel otherwise suitably insulated, is fixed upon the shaft $b^1$, by means of which wheel the shaft may be turned so as to move it axially in its bearings, and into and out of engagement with the shell section D. The outer end of the shaft $b^1$, may be provided with a crank to expedite such turning, when the work is not in circuit.

The chuck C, constructed as a short shaft $c^1$, bored to receive an expansion spring $c^4$, is journalled in a bearing $c^3$, secured in the head $a^1$. The bearing $c^3$ is flanged as shown, to resist the outward thrust of the chuck C, due to the pressure of the chuck B. A ring at the outer end of the shaft $c^1$, limits the movement of the chuck C in the reverse direction. A set screw threaded through plate $c^2$, attached to the block $a^1$, enables the pressure of the spring $c^4$ to be adjusted, as may be desired, to equalize the pressure of the chuck B upon the chuck C. At its inner end the shaft $c^1$, is provided with a pinion $c^6$, upon the face of which is formed a plug $c^7$, reduced at $c^8$, and adapted to enter and shoulder against the outer end of the tubular section $D^1$, the chucks B and C engaging the outer end sections of the shell in like manner.

A shaft E, journalled at one end in the block $a^1$, has fixed thereon a pinion $e^1$, engaging an idle pinion $e^2$, by means of which the rotation of the shaft is transmitted to the gear $c^6$, of the chuck C. At its other end the shaft E is journalled in a resilient arm F, attached at its lower end to the rear of the table A. Intermediate its bearings, the shaft E is provided with a crown gear $e^3$, and at its free end the said shaft carries a pinion $e^4$.

A crank G, provided with a wooden or other insulated handle $g^1$, is secured upon the front end of a short cross shaft $g^2$, mounted in bearings on the table. A pinion $g^3$, upon the rear end of the crank shaft, engages the crown gear $e^3$ of the shaft E. By turning the crank shaft, the tubular shell clamped between the chucks B and C, is rotated.

In order to facilitate the assembly of the shell sections and bring the abutting edges thereof in exact alignment preparatory to welding, I have provided a cradle H, centrally pivoted upon the table A, so as to have universal motion, the pivotal point of the cradle being directly under the meeting line of the edges of the shell sections. A handle $h^1$, attached to the cradle, enables the operator to move the cradle to whatever extent may be necessary to position the shell sections with relation to each other, and secure such alignment. The cradle is provided with four rollers $h^2$, two at each end. The tail section $D^1$ of the shell is placed in the cradle and engaged with the chuck C. The head section D, of the shell is placed in the cradle, and when alignment of the sections has been secured by the necessary movement of the cradle, chuck B is advanced by turning the hand wheel $b^6$. The reduced end of the cap $b^4$, of chuck B, engages the end of the shell, and wedges into place. This wedging action raises the assembled shell so that it is now supported and clamped between the chucks, entirely clear of the cradle, and free to rotate out of contact therewith. The screw shaft of chuck B, will be rotated until the abutting edges of the assembled shell sections are in line with the point of the electrode, the compression of spring $c^4$, and the sliding engagement of pinions $e^2$ and $c^6$, permitting this movement.

Two standards I and $I^1$, extending from the rear of the table, support the electrode feeding devices. At their upper ends and between these standards a lever $i$, is pivoted, which lever pivotally supports at its front end the electrode carrier $i^1$. The lever $i$ is formed out of a board of soft wood, and is slitted at $i^2$, for a part of its length from its front end, and one branch is chamfered at $i^3$, for the purpose of providing the resiliency necessary for the initial movement and quick reciprocation of the electrode to strike the arc at the commencement of the welding operation. To the other branch of the lever $i$, a rack $i^4$ is connected, such rack engaging the pinion $e^4$, on the shaft E. A grooved roll $i^5$, attached to the table A, serves to direct the longitudinal movements of the rack $i^4$, and prevent lateral movement of out of engagement with the pinion $e^4$. A compression spring $i^6$, attached at one end to the lever $i$ and at the other to the rack $i^4$, acts to hold the rack in the groove of roll $i^5$. A compression spring $i^7$, connected to one of the standards and the lever $i$, acts to hold the electrode feeding devices in normal, elevated position.

A housing or shield K, arranged so as to enclose the work at the welding line will be employed. Such housing is pivoted at $k^1$, and may be turned back whenever it may be necessary, so as to give access to the work, to insert or remove the same. A guide $k^2$, for the free end of the electrode is carried by the housing, and serves to hold the end of the electrode $i^{10}$, against lateral displacement while being fed during the welding operation. A frame $k^3$, for a colored glass screen $k^4$, is pivoted to a post $k^5$, formed on the housing K. The frame $k^3$, may be turned to one side, to permit inspection of the work through an opening in the top of housing K, when desired. As in the apparatus disclosed in my application referred to, the colored glass screen is set in a hood, mounted for vertical adjustment to meet the requirements of operatives of different stature.

A switch S, for making and breaking the circuit, is arranged on the table A, for convenient operation. The positive terminal of the electric circuit leads to the fusible electrode carrier, while the negative leads to the chuck C. Or, the negative may be arranged as a brush to contact with the shell when the latter is clamped in position; the manner in which the contact is made is not material. The transformer is indicated at T, Fig. 1.

From the foregoing description of my apparatus, it will be seen that when the shell sections have been properly positioned and a fusible electrode fitted to the carrier, a smart tap or blow upon the resilient end of the lever $i$, will strike an arc, at which moment the crank G will be turned to rotate the shell. Through the pinion $e^4$, rack $i^4$, and other connections which have been described, this crank motion serves also to feed the now fusing electrode at a definite rate of speed, bearing the ratio of the speed of the work at the welding line during its rotation. As a result, the fused electrode is deposited evenly and uniformly along the welding line, and at a time when the parts to be welded have been brought to a welding heat.

Upon completion of the welding operation, it is desirable to restore the electrode carrier to its normal position immediately, and this result I achieve by mounting the inner end of the shaft E, so as to be moved to free the pinion $e^4$, from engagement with the rack $i^4$, and permit the spring $i^7$, to raise the lever $i$, together with the rack and the electrode carrier. The arm F, is hereinbefore referred to as supporting the inner end of the shaft E, and as being attached at its lower end to the table A. Between such point of attachment and the journal for the shaft E, the arm is chamfered, as at $f^1$, to constitute a resilient portion, which will readily admit of manual flexing to disengage the pinion from the rack, and yet possess sufficient rigidity to hold the said parts in engagement while the apparatus is operating. The reengagement of the pinion and rack is automatic upon the release of the arm F. Also, as before stated, any position in which the chucks B and C, and the driving connections for the latter, may come to a rest, will be the normal position for assembling the shell sections for welding.

By turning the hand wheel $b^6$ alternately in reverse directions, the shell clamped between the chucks B and C, will be given a slight longitudinal traverse, the spring $c^4$, at such times responding to the movements of the screw $b^2$. This longitudinal movement of the shell, coupled with its rotary movement, during the welding operation, will cause the welding line to take a variable or zig-zag course about the shell, such course being limited to the extent of the longitudinal motion given to the shell.

In Fig. 4, I have shown my invention adapted for seam welding and constructed so as to move the work past the point of the electrode, which latter is held relatively stationary. The stand M, upon which the shell is pillowed is connected to a rack $m$, on the crank shaft $m^2$. A similar pinion on the shaft $m^2$, engages a rack $m^3$, moving vertically, and carrying in fixed adjustment at its upper end the electrode carrier head D. By rotating the crank shaft $m^2$, the racks $m$ and $m^3$ are reciprocated simultaneously, and the electrode is fed and fused in the ratio of the traverse of the work to be welded.

In Fig. 5, I have shown a modification of the construction illustrated in Fig. 4, in that the electrode carrier head is mounted upon a pivoted bell-crank lever L, and the stand $l$, upon which the shell is pillowed is mounted upon an oscillating frame $l^1$, pivoted at its lower end. The bell-crank lever L, and the frame $l^1$, are connected by a link $l^2$, so as to operate in unison. A rack $l^3$, attached at one end to the frame $l^1$, is moved longitudinally by a pinion $l^4$, operated by a crank $l^5$. The operation is as in the mechanism shown in Fig. 4.

What I claim and desire to secure by Letters Patent of the United States is:—

1. In an arc-welding apparatus, an electrical welding circuit of which a fusible electrode forms a part, a carrier for the electrodes, devices for imparting an initial movement to the said carrier to strike an arc between the electrode and the work to be welded, devices for feeding the fusible electrode and for moving the work past the point of the fusible electrode at a speed in fixed ratio to the consumption of the electrode, whereby the fused electrode is evenly deposited and amalgamated with the work, and means to disconnect the electrode carrier from its actuating devices to permit the quick return of the carrier to initial position.

2. An arc-welding apparatus in which a fusible electrode and the work to be welded are in an electrical welding circuit, chucks for clamping and holding the work, connected devices for feeding the fusible electrode and for rotating the work past the point of the fusible electrode at a speed in fixed ratio to the consumption of the electrode, whereby the fused electrode is evenly deposited and amalgamated with the work, and means to disconnect the electrode feeding devices from their actuating means to permit the return of said devices to their initial position.

3. An arc-welding apparatus having devices for rotating the work past the point of a fusible electrode at a speed in fixed ratio to the consumption of the electrode, connected devices for feeding the electrode, and means for disconnecting the electrode feeding devices, and a spring to return the latter to initial position.

4. An arc-welding apparatus designed for welding curved surfaces, comprising a carrier for supporting and moving the work through an arcuate path, means for so actuating the carrier, and for feeding a fusible electrode to the work in the ratio of the movement of the latter.

5. An arc welding apparatus for welding joints which are curved longitudinally with respect to the work, comprising a welding circuit including a fusible electrode with its point in proximity to the line of the weld, means for feeding the electrode as the latter is fused, and means for moving the longitudinally curved surface of the work to be welded past the point of the fusing electrode.

6. An apparatus for welding curved surfaces in the direction of their length, comprising an arc welding circuit including a fusible electrode arranged with its point in proximity to the work to be welded, means for moving the curved surface longitudinally past the point of the electrode, and means for feeding the electrode as the latter is fused.

7. An apparatus for welding curved surfaces in the direction of their length, comprising an arc welding circuit including a current conducting fusible electrode arranged with its point in proximity to the work to be welded, means for moving the curved surface longitudinally past the point of the electrode, and means for feeding the electrode as the latter is fused.

8. The process of welding curved work which consists in forming the work to be welded with a longitudinally curved welding line, arranging a fusible electrode with its point in proximity to the welding line, moving the work longitudinally with relation to the point of the electrode, and feeding the electrode to the work during the movement of the latter in the ratio of the fusion of the electrode.

In testimony whereof, I affix my signature this 27th day of November, 1918.

R. STANLEY SMITH.